(12) United States Patent
Stoisits et al.

(10) Patent No.: US 9,399,899 B2
(45) Date of Patent: Jul. 26, 2016

(54) SYSTEM AND METHOD FOR TRANSPORTING HYDROCARBONS

(75) Inventors: Richard F Stoisits, Kingwood, TX (US); Jason W Lachance, Pearland, TX (US); Larry D Talley, Friendswood, TX (US); Douglas J. Turner, Humble, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 449 days.

(21) Appl. No.: 13/187,226

(22) Filed: Jul. 20, 2011

(65) Prior Publication Data

US 2011/0308625 A1 Dec. 22, 2011

Related U.S. Application Data

(63) Continuation-in-part of application No. PCT/US2011/020383, filed on Jan. 6, 2011.

(60) Provisional application No. 61/311,034, filed on Mar. 5, 2010.

(51) Int. Cl.
*E21B 37/06* (2006.01)
*E21B 43/12* (2006.01)
*C09K 8/52* (2006.01)

(52) U.S. Cl.
CPC . *E21B 37/06* (2013.01); *C09K 8/52* (2013.01); *C09K 2208/22* (2013.01); *Y10T 137/0318* (2015.04); *Y10T 137/8376* (2015.04); *Y10T 137/87571* (2015.04)

(58) Field of Classification Search
CPC .................................. E21B 37/06; E21B 43/12
See application file for complete search history.

(56) References Cited

U.S. PATENT DOCUMENTS

| | | | |
|---|---|---|---|
| 3,637,494 A * | 1/1972 | Sullivan | 507/221 |
| 3,929,318 A * | 12/1975 | Saidla | 366/181.5 |
| 5,343,945 A * | 9/1994 | Weingarten et al. | 166/105.5 |
| 5,536,893 A | 7/1996 | Gudmundsson | 585/15 |
| 5,741,758 A * | 4/1998 | Pakulski | 507/90 |
| 5,816,280 A | 10/1998 | Rojey et al. | 137/13 |
| 5,877,361 A | 3/1999 | Rojey et al. | 585/15 |
| 5,941,096 A | 8/1999 | Gudmundsson | 62/633 |
| 6,307,191 B1 | 10/2001 | Waycuilis | 219/687 |
| 6,350,928 B1 | 2/2002 | Waycuilis et al. | 585/15 |
| 6,656,366 B1 | 12/2003 | Fung et al. | 210/737 |
| 6,672,391 B2 | 1/2004 | Anderson et al. | 166/357 |
| 6,703,534 B2 | 3/2004 | Waycuilis et al. | 585/15 |
| 6,774,276 B1 | 8/2004 | Lund et al. | 585/899 |
| 6,867,262 B1 | 3/2005 | Angel et al. | 525/326.9 |
| 7,008,466 B2 | 3/2006 | Collins | 95/153 |
| 7,253,138 B2 | 8/2007 | Dahlmann et al. | 508/243 |
| 7,261,810 B2 | 8/2007 | Argo et al. | 208/370 |
| 7,541,009 B2 | 6/2009 | Takao et al. | 422/198 |
| 7,597,148 B2 | 10/2009 | O'Malley et al. | 166/304 |
| 7,615,516 B2 | 11/2009 | Yang et al. | 507/90 |
| 7,703,535 B2 | 4/2010 | Benson | 166/368 |
| 7,856,848 B2 | 12/2010 | Lu | 62/623 |
| 2004/0176650 A1 | 9/2004 | Lund et al. | 585/15 |
| 2005/0137432 A1 * | 6/2005 | Matthews et al. | 585/15 |
| 2006/0009363 A1 | 1/2006 | Crews | 507/100 |
| 2007/0276169 A1 | 11/2007 | Tohidi et al. | 585/15 |
| 2008/0023071 A1 | 1/2008 | Smith et al. | 137/13 |
| 2008/0064611 A1 | 3/2008 | Spratt | 507/90 |
| 2008/0312478 A1 | 12/2008 | Talley et al. | 585/15 |
| 2009/0054733 A1 | 2/2009 | Marescaux et al. | 600/141 |
| 2009/0062579 A1 | 3/2009 | Nazari et al. | 585/15 |
| 2009/0078406 A1 | 3/2009 | Talley et al. | 166/177.3 |
| 2009/0124520 A1 | 5/2009 | Tohidi | 507/90 |
| 2009/0221451 A1 | 9/2009 | Talley | 507/90 |
| 2010/0012325 A1 | 1/2010 | Friedemann | 166/335 |
| 2010/0018712 A1 | 1/2010 | Tian et al. | 166/310 |
| 2010/0099807 A1 | 4/2010 | Carlise et al. | 524/377 |
| 2010/0099814 A1 | 4/2010 | Conrad et al. | 524/555 |
| 2010/0180952 A1 | 7/2010 | Verhelst et al. | 137/2 |
| 2010/0236634 A1 | 9/2010 | Nuland et al. | 137/13 |

FOREIGN PATENT DOCUMENTS

| | | | |
|---|---|---|---|
| EP | 0566394 | 10/1993 | E21B 43/26 |
| EP | 1159238 | 8/2008 | C07C 7/20 |
| EP | 1957856 | 3/2009 | F17C 7/04 |
| WO | WO00/25062 | 5/2000 | F17D 3/14 |
| WO | WO2005/026291 | 3/2005 | |
| WO | WO2005/058450 | 6/2005 | |
| WO | WO2006/048666 | 5/2006 | C10L 3/10 |
| WO | WO2006/068929 | 6/2006 | E21B 23/08 |
| WO | WO2007/095399 | 8/2007 | C10L 1/04 |
| WO | WO2008/023979 | 2/2008 | F17D 3/14 |
| WO | WO2009/008737 | 1/2009 | C02F 1/52 |
| WO | WO2009/054733 | 4/2009 | C09K 8/52 |
| WO | WO2010/083095 | 7/2010 | E21B 36/00 |

OTHER PUBLICATIONS

Hemmingson, P. V. et al. (2008) "Hydrate Plugging Potential in Underinhibited Systems", *Proc. of the 6th ICGH*, Vancouver, Canada, Jul. 6-10, 2008.
PCT International Search and Written Opinion dated Mar. 8, 2011, 7 pages.

* cited by examiner

*Primary Examiner* — Randy Boyer
(74) *Attorney, Agent, or Firm* — ExxonMobil Upstream Research Company Law Department

(57) ABSTRACT

Methods and systems are provided for producing hydrocarbons from production fluids that have water as an external phase. A method for transporting a hydrocarbon through a pipeline includes injecting water into a production stream at a production center. The production stream includes a hydrocarbon, and the water injection forms a transportation stream that includes a water external phase. The transportation stream is flowed through a transportation line to a surface facility, wherein the transportation line comprises a plurality of static mixers spaced at intervals along the transportation line.

13 Claims, 13 Drawing Sheets

200

300

700

SYSTEM AND METHOD FOR TRANSPORTING HYDROCARBONS

RELATED APPLICATIONS

The present application is a continuation in part of PCT Patent Application number PCT/US2011/020,383, entitled "SYSTEM AND METHOD FOR CREATING FLOWABLE HYDRATE SLURRIES IN PRODUCTION FLUIDS," filed on Jan. 6, 2011, which claims priority to U.S. Provisional Patent Application No. 61/311,034 entitled "SYSTEM AND METHOD FOR CREATING FLOWABLE HYDRATE SLURRIES IN PRODUCTION FLUIDS," filed on Mar. 5, 2010, which is herein incorporated by reference in its entirety.

FIELD

Embodiments of the present techniques relate to increasing the flowability of hydrocarbons by creating an external water phase and allowing the formation of hydrates to occur.

BACKGROUND

The presence of water in production fluids may cause problems while transporting hydrocarbons due to the formation of emulsions, clathrate hydrates, and wax deposits. The viscosity of water-in-oil emulsions makes transport through long distance pipelines difficult throughout the field life, especially as the watercut increases, which may require the use of pumps, larger pipe diameters, and/or multiple pipes to provide the backpressure necessary to cause or permit fluids to flow to the destination. Further, hydrates may form, for example, at the high pressures and low temperatures that may be found in pipelines and other hydrocarbon equipment. After forming, the hydrates can agglomerate, leading to plugging or fouling of the equipment. Often under the same conditions that cause hydrate formation, wax precipitation can occur, fouling lines and decreasing flow by effectively decreasing the pipeline diameter over time.

Clathrate hydrates (hereinafter hydrate) are weak composites formed from a water matrix and a guest molecule, such as methane or carbon dioxide, among others. Hydrates may form, for example, at the high pressures and low temperatures that may be found in pipelines and other hydrocarbon equipment. For any particular hydrate composition involving water and guest molecules, such as methane, ethane, propane, carbon dioxide, and hydrogen sulfide, at a particular pressure there is a specific hydrate equilibrium temperature, above which hydrates are not stable and below which they are stable. After forming, the hydrates can agglomerate, leading to plugging or fouling of the equipment or pipelines.

Various techniques have been used to lower the ability for hydrates to form or cause plugging or fouling. For example, such techniques have included the insulation of lines, active heating, dehydration of the hydrocarbon, and the adding of thermodynamic hydrate inhibitors (THIs), kinetic hydrate inhibitors (KHIs), and/or anti-agglomerates (AAs).

Insulation, active heating, and dehydration can be expensive, especially for subsea systems. Even with insulation, cool-down of production fluids can limit the distance of a producing pipeline. If a hydrate blockage does occur, insulation can be detrimental by preventing heat transfer from the surroundings that may be used for hydrate melting.

Thermodynamic hydrate inhibitors, such as methanol, monoethylene glycol, diethylene glycol, triethylene glycol, and potassium formate, among others, lower the hydrate formation temperature, which may inhibit the formation of the hydrate under the conditions found in a particular process. Thermodynamic inhibitors can be very effective at hydrate prevention, but the quantities required for total inhibition are large and proportional to the amount of water produced, leading to increasing and even prohibitive quantities late in field life. Low dosage hydrate inhibitors (LDHIs) exist, including kinetic hydrate inhibitors (KHIs) and anti-agglomeration agents (AAs). Kills delay the nucleation of hydrates, but not by changing the thermodynamic conditions. Instead, KHIs inhibit the nucleation and growth of the hydrate crystals.

An alternative to the use of THIs and KHIs is cold flow technology, in which hydrate can be formed in a manner that prevents hydrate particles from sticking to each other without the use of chemical inhibitors. For example, U.S. Pat. No. 6,703,354 to Waycuilis, et al., discloses a transport process for a wet gas that employs a subsea heat exchanger that uses the ambient subsea temperature to cool a hydrocarbon stream. A portion of the hydrocarbon stream is converted by the cooling to solid gas hydrate particles. A solid particle medium entrained within the hydrocarbon stream prevents the build-up of gas hydrate particles in the hydrocarbon flow. The gas hydrate particles mix with the remaining liquid phase components of the hydrocarbon stream to form a gas hydrate slurry, which is conveyed through a subsea transport pipeline.

Cold flow has been demonstrated to be successful in systems where oil is the external phase in a water-oil system. The external oil phase is important to this process since cold flow benefits from the generation of small water droplets that can be converted to hydrate particles. Following hydrate formation sufficient liquid should be present to mobilize the hydrate particles. However, at high watercuts, current cold flow strategies may be inadequate.

At high watercuts, where the water phase is external, uninhibited hydrate will continue to form until the water or the gas is exhausted, which may lead to plugging. Wax in another issue in long distance transport. Traditional methods for dealing with wax include insulation to prevent the fluids from dropping below the wax appearance temperature (WAT), pipeline pigging, wax inhibitors to slow deposition, and pour point depressants to prevent gelling. Like that for maintaining the temperature above the hydrate region, insulation may not be adequate in severe environments and will have limitations on the distance in which temperatures can be maintained above the desired WAT. In long distance transport, pigging also becomes more difficult due to the large amounts of fluid and wax to be pushed through the system, potentially resulting in a wax plug. The pressures required to push a pig through the system and move such fluids/wax could even require pumps, resulting in large capital costs. In addition, pigging could require long downtimes in extended pipes. Similar techniques to those used for hydrate inhibition may also be used to inhibit the formation of wax deposits.

These techniques discussed above may fall to keep hydrates and wax particles suspended throughout the entire transportation line to the surface, especially as the material passes through various temperature gradients. Further, as a field matures, it will produce more water. A field may eventually produce primarily water which can limit hydrate remediation strategies and can dictate the end of profitable field production.

SUMMARY

An embodiment of the present techniques provides a method for transporting a hydrocarbon through a pipeline. The method includes injecting water into a production stream at a production center, wherein the production stream includes a hydrocarbon, and wherein the water injection forms a transportation stream including a water external phase. The transportation stream is flowed through a transportation line to a surface facility. The transportation line includes a plurality of static mixers spaced at intervals along the transportation line.

Another embodiment provides a system for transporting a hydrocarbon from a production center. The system includes a water line to a production center and an injection manifold at the production center configured to inject an aqueous stream from the water line into a production stream. The production stream includes a hydrocarbon and the injection of the aqueous stream forms a transportation stream having a water external phase. A transportation line from the production center includes a plurality of static mixers and is configured to carry the transportation stream to a surface facility. The surface facility includes a separation system configured to separate the hydrocarbon from an aqueous phase, a treatment system configured to form the aqueous stream from the aqueous phase, and a pump system configured to return the aqueous stream to the production center through the water line.

Another embodiment provides a system for producing a hydrocarbon from a subsea production center. The system includes a floating production, storage, and offloading vessel (FSO). The FSO includes a separation system configured to separate a transportation stream including a water external phase into a hydrocarbon phase and an aqueous phase, a treatment system configured to treat the aqueous phase to form an aqueous stream, and a chemical injection system configured to inject chemicals into the aqueous stream. An injection line is configured to convey the aqueous stream to an injection manifold. The injection manifold is configured to blend the aqueous stream with a production stream to form the transportation stream. A transportation line is configured to carry the transportation stream from the production center to the surface facility, wherein the transportation line comprises a plurality of static mixers placed at intervals along the transportation line.

DESCRIPTION OF THE DRAWINGS

The advantages of the present techniques are better understood by referring to the following detailed description and the attached drawings, in which.

DETAILED DESCRIPTION

Figure 1:
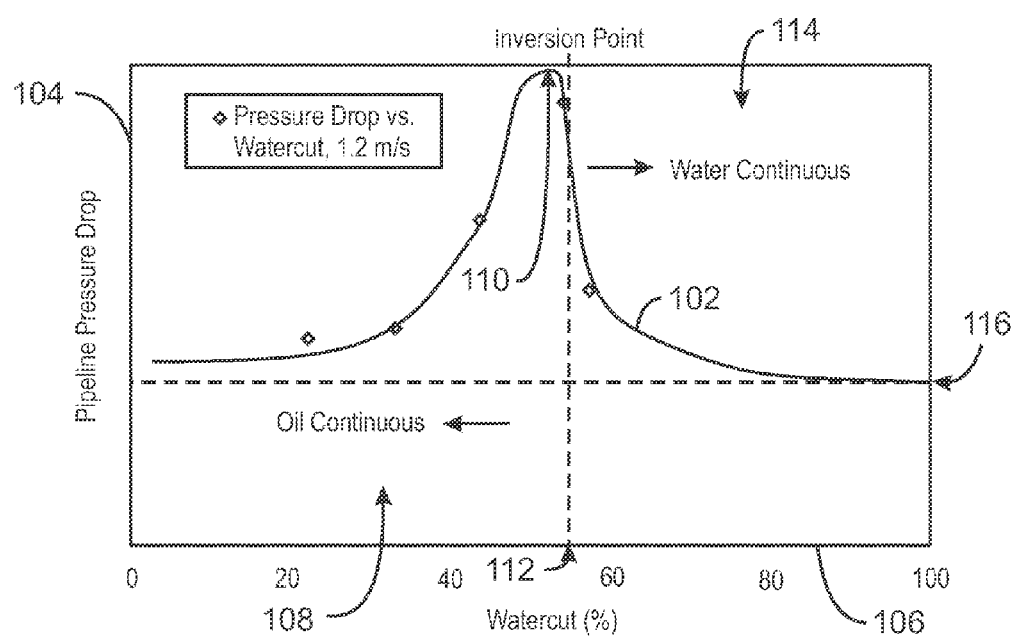
FIG. 1 is a plot of a pipeline pressure drop as watercut is increased.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

"Exemplary" is used exclusively herein to mean "serving as an example, instance, or illustration." Any embodiment described herein as "exemplary" is not to be construed as preferred or advantageous over other embodiments.

A "facility" as used herein is a representation of a tangible piece of physical equipment through which hydrocarbon fluids are either produced from a reservoir or injected into a reservoir. In its broadest sense, the term facility is applied to any equipment that may be present along the flow path between a reservoir and the destination for a hydrocarbon product. Facilities may comprise production wells, injection wells, well tubulars, wellhead equipment, gathering lines, manifolds, pumps, compressors, separators, surface flow lines, and delivery outlets. In some instances, the term "surface facility" is used to distinguish those facilities other than wells. A "facility network" is the complete collection of facilities that are present in the model, which would include all wells and the surface facilities between the wellheads and the delivery outlets. One type of facility is a "production center." As used herein, a production center includes the wells, wellheads, and other equipment associated with the initial production of a hydrocarbon and the formation of a transportation stream for bring the hydrocarbon to the surface.

A "formation" is any finite subsurface region. The formation may contain one or more hydrocarbon-containing layers, one or more non-hydrocarbon containing layers, an overburden, and/or an underburden of any subsurface geologic formation. An "overburden" and/or an "underburden" is geological material above or below the formation of interest.

The term "FSO" refers to a Floating Storage and Offloading vessel, which may be considered to be one type of surface facility. A floating storage device, usually for oil, is commonly used where it is not possible or efficient to lay a pipe-line to the shore. A production platform can transfer hydrocarbons to the FSO where they can be stored until a tanker arrives and connects to the FSO to offload ft. The FSO may also contain production facilities. A FSO may include a liquefied natural gas (LNG) production platform or any other floating facility designed to process and store a hydrocarbon prior to shipping.

The term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state. As used herein, "fluid" is a generic term that may include either a gas or vapor.

As used herein, a "hydrate" is a composite made of a host compound that forms a basic framework and a guest compound that is held in the host framework by inter-molecular interaction, such as hydrogen bonding, Van der Waals forces, and the like. Hydrates may also be called host-guest complexes, inclusion compounds, and adducts. As used herein, "clathrate," "clathrate hydrate," and "hydrate" are interchangeable terms used to indicate a hydrate having a basic framework made from water as the host compound. A hydrate is a crystalline solid which looks like ice and forms when water molecules form a cage-like structure around a "hydrate-forming constituent."

A "hydrate-forming constituent" refers to a compound or molecule in petroleum fluids, including natural gas that forms hydrate at elevated pressures and/or reduced temperatures. Illustrative hydrate-forming constituents include, but are not limited to, hydrocarbons such as methane, ethane, propane, butane, neopentane, ethylene, propylene, isobutylene, cyclopropane, cyclobutane, cyclopentane, cyclohexane, and benzene, among others. Hydrate-forming constituents can also include non-hydrocarbons, such as oxygen, nitrogen, hydrogen sulfide, carbon dioxide, sulfur dioxide, and chlorine, among others.

A "hydrocarbon" is an organic compound that primarily includes the elements hydrogen and carbon although nitrogen, sulfur, oxygen, metals, or any number of other elements may be present in small amounts. As used herein, hydrocarbons generally refer to organic materials that are transported by pipeline, such as any form of natural gas or oil. A "hydrocarbon stream" is a stream enriched in hydrocarbons by the removal of other materials such as water and/or THI. The hydrocarbons may include paraffins, which are alkanes having a general chemical formula of $C_nH_{2n+2}$. In paraffins, n is often about 20 to about 40. The paraffins may form solid deposits which may be referred to as "wax deposits" herein. Other chemical components may also be included in the wax deposits. The temperature at which wax deposits start to form may be termed the "wax appearance temperature" or the WAT.

"Kinetic hydrate inhibitor" refers to a molecule and/or compound or mixture of molecules and/or compounds capable of decreasing the rate of hydrate formation in a petroleum fluid that is either liquid or gas phase. A kinetic hydrate inhibitor can be a solid or liquid at room temperature and/or operating conditions. The hydrate formation rate can be reduced sufficiently by a kinetic hydrate inhibitor such that no hydrates form during the time fluids are resident in a pipeline at temperatures below the hydrate formation temperature.

For the inhibition of hydrate formation by thermodynamic or kinetic hydrate inhibitors, the term "minimum effective operating temperature" refers to the temperature above which hydrates do not form in fluids containing hydrate forming constituents during the time the fluids are resident in a pipeline. For thermodynamic inhibition only, the minimum effective operating temperature is equal to the thermodynamically inhibited hydrate formation temperature. For kinetic hydrate inhibitors, the minimum effective operating temperature is lower than the thermodynamically inhibited hydrate formation temperature. For a combination of thermodynamic and kinetic inhibition, the minimum effective operating temperature may be even lower than the thermodynamically inhibited hydrate formation temperature by itself.

The term "natural gas" refers to a multi-component gas obtained from a crude oil well (termed associated gas) or from a subterranean gas-bearing formation (termed non-associated gas). The composition and pressure of natural gas can vary significantly. A typical natural gas stream contains methane ($CH_4$) as a significant component. Raw natural gas will also typically contain ethylene ($C_2H_4$), ethane ($C_2H_6$), other hydrocarbons, one or more acid gases (such as carbon dioxide, hydrogen sulfide, carbonyl sulfide, carbon disulfide, and mercaptans), and minor amounts of contaminants such as water, nitrogen, iron sulfide, wax, and crude oil.

"Pressure" is the force exerted per unit area by the gas on the walls of the volume. Pressure can be shown as pounds per square inch (psi). "Atmospheric pressure" refers to the local pressure of the air. "Absolute pressure" (psia) refers to the sum of the atmospheric pressure (14.7 psia at standard conditions) plus the gage pressure (psig). "Gauge pressure" (psig) refers to the pressure measured by a gauge, which indicates only the pressure exceeding the local atmospheric pressure (i.e., a gauge pressure of 0 psig corresponds to an absolute pressure of 14.7 psia).

"Production stream" refers to a liquid and/or gaseous stream removed from a subsurface formation, such as an organic-rich rock formation. Production streams may include both hydrocarbon fluids and non-hydrocarbon fluids. For example, production streams may include, but are not limited to, oil, natural gas and water.

"Substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context.

A "static mixer" is an apparatus for mixing liquids and/or gases, wherein the mixing is not accomplished through motion of the apparatus, but through the motion of the liquid and/or gas. A static mixer may help to reduce a droplet sizes within the liquids and gases, and, thus, may assist in the formation and maintenance of emulsions and slurries.

A "surfactant" or surface active agent is a compound or material that has some compatibility with each of two immiscible phases, which lowers the interfacial tension between the phases. As a result, it locates to the interfaces between the phases. Examples of surfactants include detergents, fatty acids and their salts, block copolymers of ethylene oxide and ethylene, and the like.

"Thermodynamic hydrate inhibitor" refers to compounds or mixtures capable of reducing the hydrate formation temperature in a petroleum fluid that is either liquid or gas phase. For example, the minimum effective operating temperature of a petroleum fluid can be reduced by at least 1.5° C., 3° C., 6° C., 12° C., or 25° C., due to the addition of one or more thermodynamic hydrate inhibitors. Generally the THI is added to a system in an amount sufficient to prevent the formation of any hydrate.

"Well" or "wellbore" refers to a hole in the subsurface made by drilling or insertion of a conduit into the subsurface. The terms are interchangeable when referring to an opening in the formation. A well may have a substantially circular cross section, or other cross-sectional shapes (for example, circles, ovals, squares, rectangles, triangles, slits, or other regular or irregular shapes). Wells may be cased, cased and cemented, or open-hole well, and may be any type, including, but not limited to a producing well, an experimental well, an exploratory well, or the like. A well may be vertical, horizontal, or any angle between vertical and horizontal (a deviated well), for example a vertical well may comprise a non-vertical component.

Oil, water, and gas are usually produced together from a field resulting in a multiphase flow where the oil is the dominate phase in the early field life (oil continuous flow). However, as the field ages, the watercut may increase, as fewer hydrocarbons are produced. Due to the viscosity of water-in-oil emulsions, transport through long distance pipelines may become difficult as the field ages. For this reason, among others, older fields may use pumps to push the fluids to the destination.

FIG. 1 is a plot 100 of a pipeline pressure drop 102 as watercut is increased. The y-axis 104 represents the pressure drop across the pipeline at a flow rate of 1.2 m/s, while the x-axis 106 represents the watercut in percent of the total fluids. As can be seen in the plot 100, as the watercut increases in an oil-continuous phase 108, the pressure drop 102 increases until a maximum 110 is reached just before an inversion point 112. At the inversion point 112, the composition changes to a water continuous phase 114. At this point, the pressure drop 102 decreases substantially and, as the watercut increases, may reach a lower level than oil with no water.

The methods and systems disclosed herein are directed to creating a water continuous transportation stream, in which oil, gas, or a mixture is entrained in an abundant water phase which is transported by pipeline. Since water is less viscous than oil or oil continuous emulsions, as indicated by the lower pipeline pressure drop 102 shown at reference number 116, the water continuous dispersion can be transported over much longer distances without the aid of pumps. Further, water may be added to create a water continuous emulsion. Depending on the amounts of water added, additional pipelines may be used to transport the larger volumes. A number of static mixers are placed at intervals in the pipeline to mix the emulsion, which may assist in preventing separation. Accordingly, this may prevent hydrates from agglomerating and fouling the pipeline. Further, wax deposits may be decreased by the formation of the oil-in-water emulsion, as discussed with respect to FIG. 2.

Figure 2:
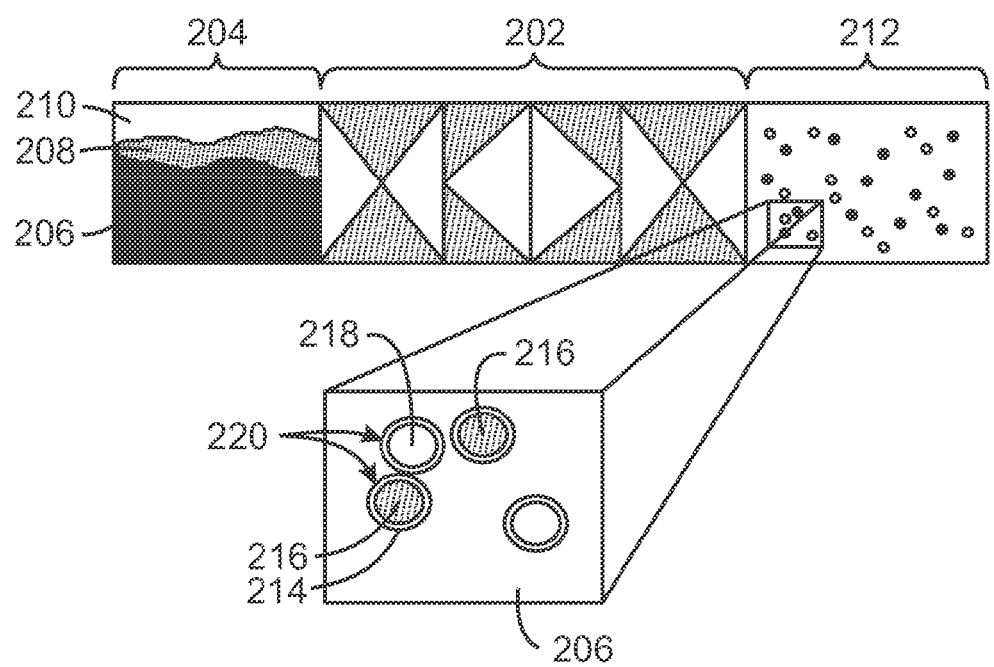
FIG. 2 is a drawing showing the effect of static mixers on a mixed hydrocarbon and water stream.

FIG. 2 is a drawing 200 showing the effect of static mixers 202 on a mixed hydrocarbon and water stream 204. In the mixed stream 204, water 206 is the dominate component, or continuous phase. The water 206 may be added to the produced fluids at a production center to achieve this result. Thus, smaller amounts of oil 208, gas 210, or both, may be present. The temperature of the environment may be lower than both the formation temperature for hydrates and the wax appearance temperature (WAT), resulting in the formation of hydrate deposits, wax deposits, or both as the mixed stream 204 cools, which may result in fouling of a transportation line.

The mixed stream 204 may flow through the static mixers 202 to promote the formation of a transportable hydrate slurry 212 that has hydrates 214 at the interfaces between oil 208 and water 206 (e.g., around oil droplets 216) and gas 210 and water 206 (e.g., around gas bubbles 218). The hydrates 214 that form around the gas bubbles 218 and oil droplets 216 may surround light hydrocarbons such as methane and ethane. Thus, the hydrates 214 may provide a barrier that helps to prevent these compounds from contacting the water 206 and forming more hydrate 214. In comparison to a hydrate slurry in an oil continuous phase, the attractive forces between hydrate surrounded particles 220 may also be reduced by making water the continuous phase in a slurry.

Wax deposition may also be decreased with a transportable hydrate slurry 212 having a water continuous phase in comparison to an oil continuous phase. Especially in long distance tiebacks, insulation limitations create issues for keeping the fluids above both the wax appearance temperature and the hydrate equilibrium temperature. In an oil continuous flow, wax deposition may be enhanced due to the contact of the dissolved wax in the oil with the cold walls of the pipeline. However, with a transportable hydrate slurry 212 having a water continuous phase and the use of the static mixers 202, the amount of wax deposition may be decreased or eliminated due to the isolation of the wax in the oil droplets 216, which are entrained in the water 206 and surrounded by a layer of hydrates 214.

Subsea Hydrocarbon Field

Figure 3:
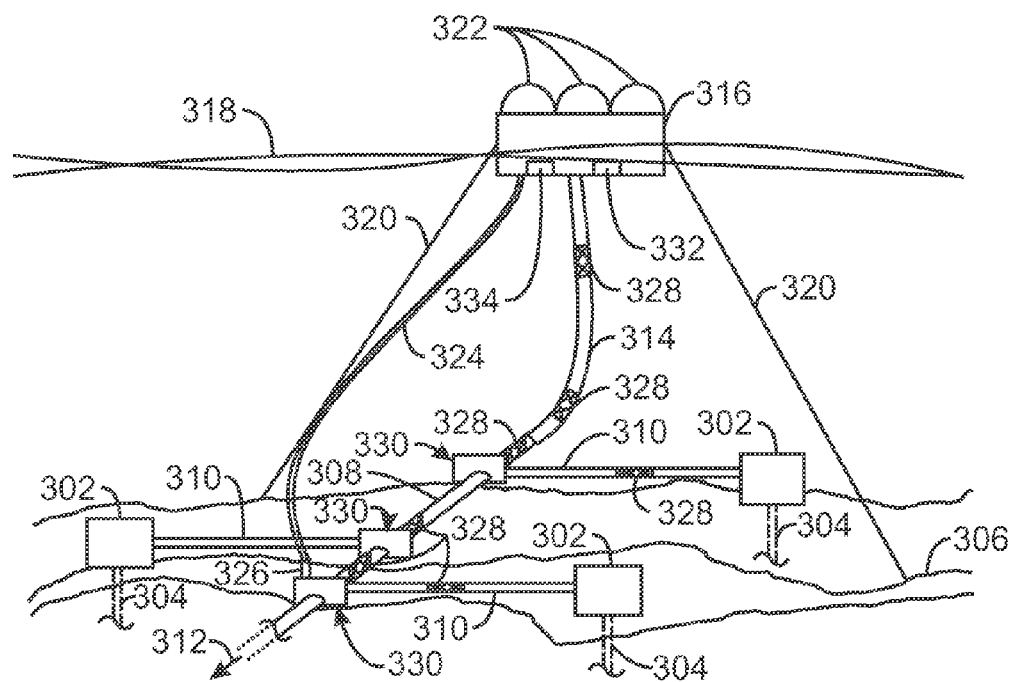
FIG. 3 is a diagram of a subsea natural gas field that can be protected from hydrate plugging.

FIG. 3 is an illustration of a subsea hydrocarbon field 300 that can be protected from hydrate plugging and wax formation. However, the present techniques are not limited to subsea fields, but may be used for the mitigation of plugging in the production or transportation of oil, oil from oil sands, natural gas, or any number of liquid or gaseous hydrocarbons from any number of sources.

As shown in FIG. 3, the hydrocarbon field 300 can have a number of wellheads 302 coupled to wells 304 that harvest hydrocarbons from a formation (not shown). As shown in this example, the wellheads 302 may be located on the ocean floor 306. Each of the wells 304 may include single wellbores or multiple, branch wellbores. Each of the wellheads 302 can be can be coupled to a central pipeline 308 by gathering lines 310. The central pipeline 308 may continue through the field 300, coupling to further wellheads 302, as indicated by reference number 312. A flexible line 314 may couple the central pipeline 308 to a surface facility 316 at the ocean surface 318. The surface facility 316 may, for example, be a floating processing station, such as a floating storage and offloading unit (or FSO), that is anchored to the sea floor 306 by a number of tethers 320. In and based embodiments, the surface facility 316 may include a central collection and processing facility in an oil or gas field. The surface facility 316 may have equipment for separation, water treatment, chemical treatment, and other processing, such as liquefaction equipment to form liquefied natural gas (LNG) for storage in vessels 322. The collection vessel 316 may transport the hydrocarbons to shore facilities by pipeline (not shown).

Prior to processing of the hydrocarbons on the surface facility 316, the collected gas may cool and form hydrates in various locations, such as the collection pipeline 308, the gathering lines 310, or the flexible line 314, among others. The formation of the hydrates may lead to partial or even complete plugging of the lines 308, 310, and 314. Similarly, in onshore fields, hydrates can plug wells, gathering lines, and collection lines. In an embodiment, an aqueous stream may be added to form a water continuous phase, which may help to mitigate the formation of hydrates, for example, by a line 324 from the collection vessel 316 to one or more injection points, such as at injection manifold 326. Although the line 324 is shown as being independent of the flexible line 314 and the collection pipeline 308, the line 324 may be incorporated along with the flexible line 314 and any other utility or sensor lines into a single piping bundle. In various embodiments, the injection manifold 326 may be located on the collection pipeline 308, the gathering lines 310, the flexible line 314, or on any combinations thereof.

The aqueous stream may be injected up stream of a number of static mixers 328 that may be placed at intervals in the lines, for example, in the collection line 308 downstream of the entry points 330 for each of the gathering lines 310 and in succeeding locations up to the surface facility 316. In embodiments, two or more static mixers 328 may be used, depending in the length of the lines 308, 310, and 314, and any other cooling used. The placement of the static mixers 328 is not limited to the collection line 308, as static mixers 328 may be placed in the flexible line 314, the gathering lines 310, the wellheads 302, or even down the wells 304. Further, static mixers 328 may be placed at regular intervals, irregular intervals, or at convenient locations, such as straight sections of the lines 308, 310, and 314. Placing a THI line 324 and an injection manifold 326 down a well, for example, upstream of a static mixer 328, may be useful for mitigating hydrate formation in wellbores.

The phase behavior of the production fluid brought up the flexible line 314 from the connection pipe 308 may be monitored, for example, by an analyzer 332 located at the collection vessel 316 or at any number of other points in the hydrocarbon field 300. The analyzer 332 may determine the concentration of the hydrate, the concentration of the water phase in the production fluid, the amount of hydrocarbon present, or any combinations of these parameters. For example, a particle size analyzer may be included to analyze the different refracting items in the production fluid, such as the hydrate particles and the hydrocarbon droplets. The output from the analyzer 332 may be used to control a water addition system 334, which may be used to adjust the amount of the aqueous stream injected, as well as the amount of other chemicals, such as hydrate inhibitors, corrosion inhibitors, surfactants, and the like, sent to the injection manifold 326. The arrangement of the facility network is not limited to that shown in FIG. 3, as any number of configurations may be used, as discussed with respect to FIGS. 4-7 and 9-12.

Figure 4:
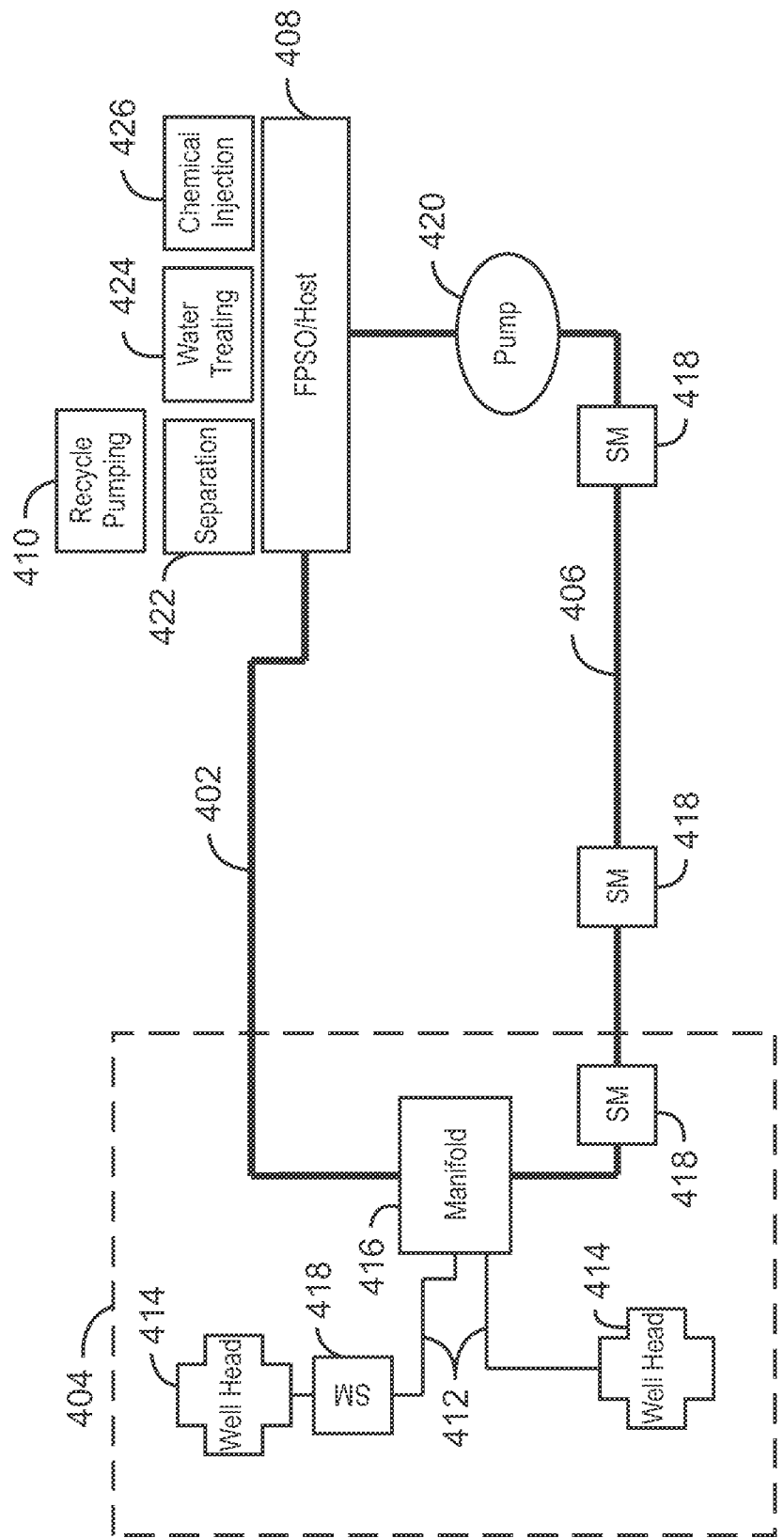
FIG. 4 is a drawing of an injection loop configuration that uses a recycle line to transport an aqueous stream to a production center and a transportation line to bring a transportation stream back from the production center to a surface facility.

FIG. 4 is a drawing of an injection loop configuration 400 that uses a recycle line 402 to transport an aqueous stream to a production center 404 and a transportation line 406 to bring a transportation stream back from the production center 404 to a surface facility 408. In an embodiment, an aqueous stream may be may be pumped through the recycle line 402 with the use of water pumps 410 on the surface facility 408. The recycle line 402 may not need to be insulated, as the aqueous stream may not include components that will separate out. The aqueous stream can be mixed with one or more production streams 412 from one or more wells 414 in an injection manifold 416 to form a transportation stream with a water continuous phase.

The transportation stream may pass through a number of static mixers 418 along the transportation line 406, which may maintain the mixture, or emulsion, and help prevent the formation of wax or hydrate deposits. Any number of types of static mixers 418 may be used. For example, the static mixers 418 may be piggable, e.g., having a mixer in a valve configuration that can switch between the static mixer 418 and an open pipeline segment.

The transportation stream would travel as a water continuous dispersion or emulsion through the transportation line 406 to the surface facility 408, which may be an FPSO in a subsea operation or may be an onshore facility. If the surface facility 408 has a long vertical riser, such as the flexible line 314 discussed with respect to FIG. 3, a pump 420 may be used to transport the transportation stream up the riser. Once at the surface facility 408, the transportation stream may pass through a separator 422, which can separate the aqueous stream From gas and oil. The gas and oil may be processed for sale. The aqueous stream may be sent to a water treatment system 424 to remove any remaining oil, filter out solids, and adjust other materials. Since the water is being transported back to the production center 404, it can also serve as a mode of transportation for typical oilfield chemicals such as scale, corrosion, and hydrate inhibitors which may be delivered through an umbilical. This will reduce the overall capacity and possibly the number of umbilicals that would be needed for a field. Thus, a chemical injection system 426 can be used to add various chemicals to the aqueous stream, prior to recycling the aqueous stream back to the production center 404.

The chemical injection system 426 may be used to add surfactants, such as polysorbates (available from ICI Americas, under the TWEEN brandname), for promoting a water continuous emulsion at low watercut. Other chemicals that may be added include, for example, kinetic hydrate inhibitors, and thermodynamic hydrate inhibitors to limit hydrate conversion or anti-agglomeration additives to minimize hydrate agglomeration. Further, typical oilfield chemicals, such as, for example, scale inhibitors, corrosion inhibitors, and the like, can also be added to the aqueous phase to be transported back to the production center 404. This may reduce or eliminate other lines, such as umbilicals, typically used for injection of these chemicals. The water can then be sent to the water pumps 410 to be recycled to the production center 404. Due to the recycle of chemicals in the aqueous stream, hydrate formation may be prevented by injecting enough inhibitors to lower the hydrate equilibrium temperature without continuing to add large amounts of inhibitors. Water make-up can also be added at the FPSO or topsides production facility.

Figure 5:
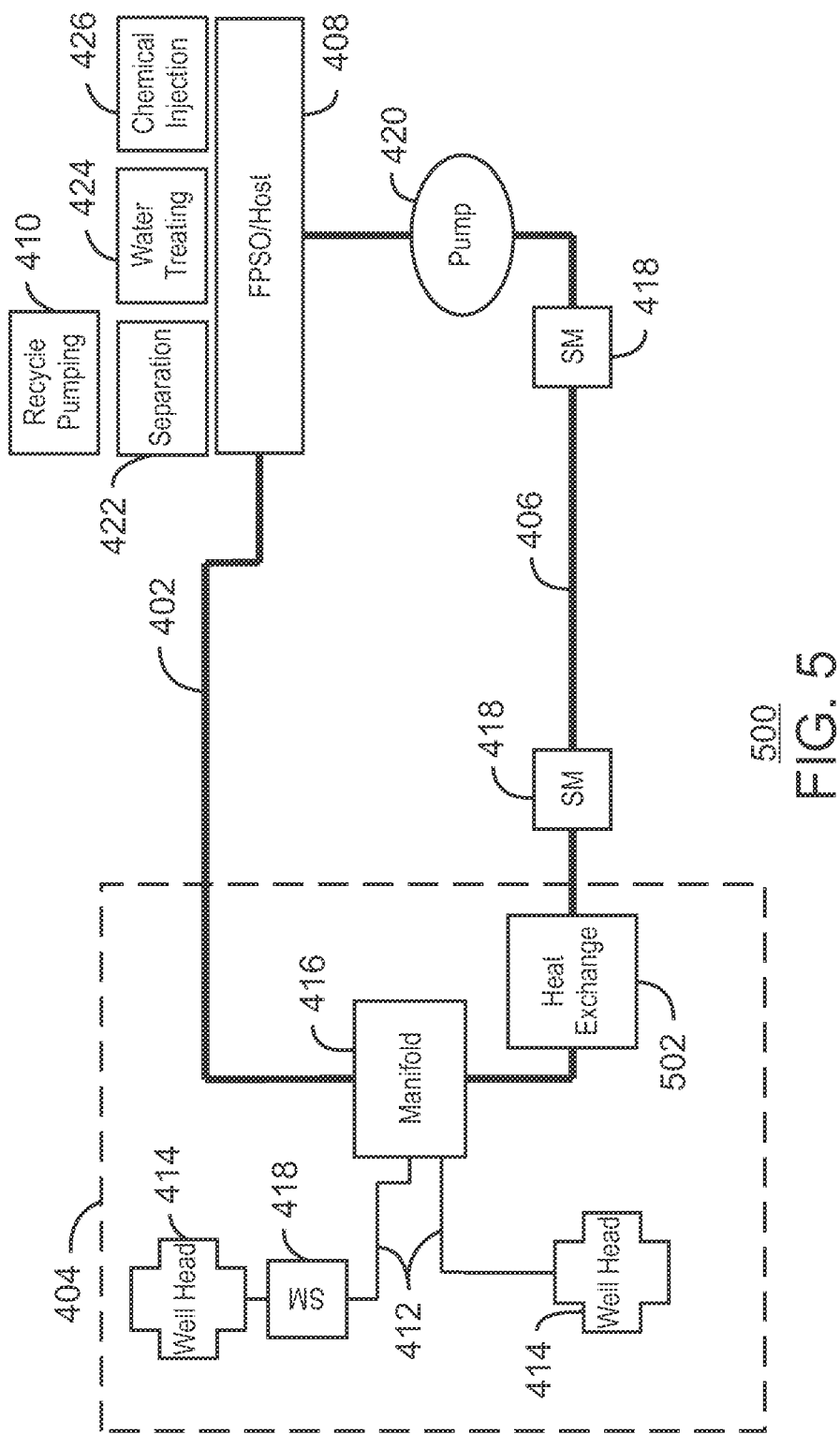
FIG. 5 is a drawing of an injection loop configuration that uses a heat exchanger to cool the transportation stream.

FIG. 5 is a drawing of an injection loop configuration 500 that uses a heat exchanger 502 to cool the transportation stream. Like numbers are as described with respect to FIG. 4. In addition to the static mixers 418 along the transportation line, the production center 404 may have a heat exchanger 502 to cool the transportation stream and enhance the formation of a hydrate slurry. The heat exchanger 502 may include an integral static mixer to blend the transportation stream as it is cooled, efficiently forming the transportable slurry.

In an embodiment, the transportation line 406 may be free of other static mixers 418, which may lower costs and operational issues. This arrangement may also allow for a localized area of hydrate formation, which may be easier to deal with during transient operations such as shut-in and restarts. However, depending on the fluid properties, such as the bubble points, additional static mixers 418 may be placed along the transportation line 406 to enhance hydrate formation as gas is evolved due to the pressure drop along the line.

Figure 6:
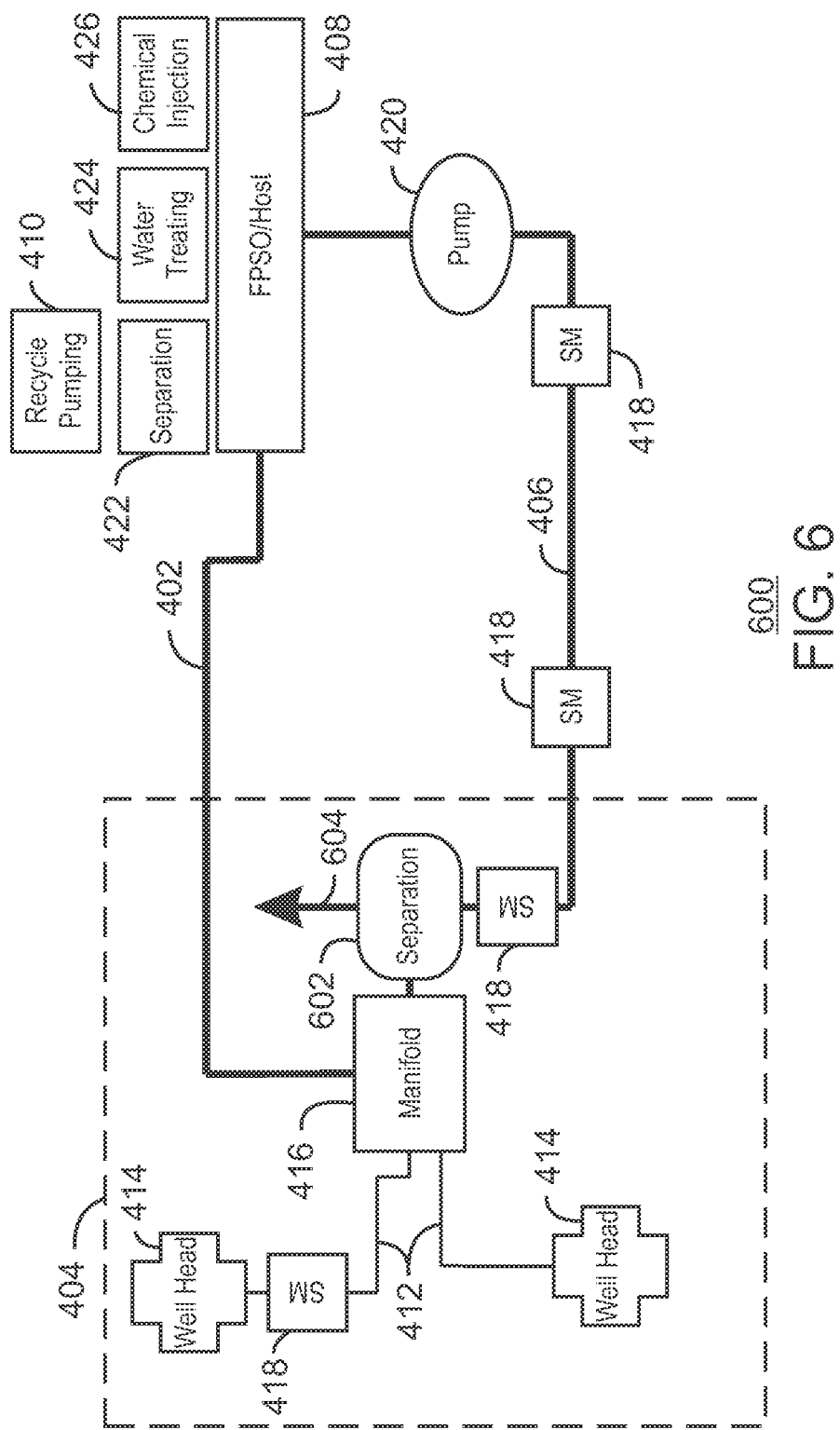
FIG. 6 is a drawing of another injection loop configuration that uses a separator in the production center downstream of the injection manifold.

FIG. 6 is a drawing of another injection loop configuration 600 that uses a separator 602 in the production center 404 downstream of the injection manifold 416. All like numbers are as described with respect to FIG. 4. The separator 602 separates liquid from gases. The resulting transportation stream may be sent through the transportation line 406 to the surface facility 408 for further processing, as described with respect to FIG. 4. The gas flow stream 604 can either be produced in another line or be injected into a reservoir, for example, for pressure maintenance. Reducing the amount of gas in the transportation line 406 going to the surface facility 408 may reduce the amount of hydrates that form and may also improve fluid flow conditions, assisting in keeping the oil droplets entrained in the water phase.

Figure 7:
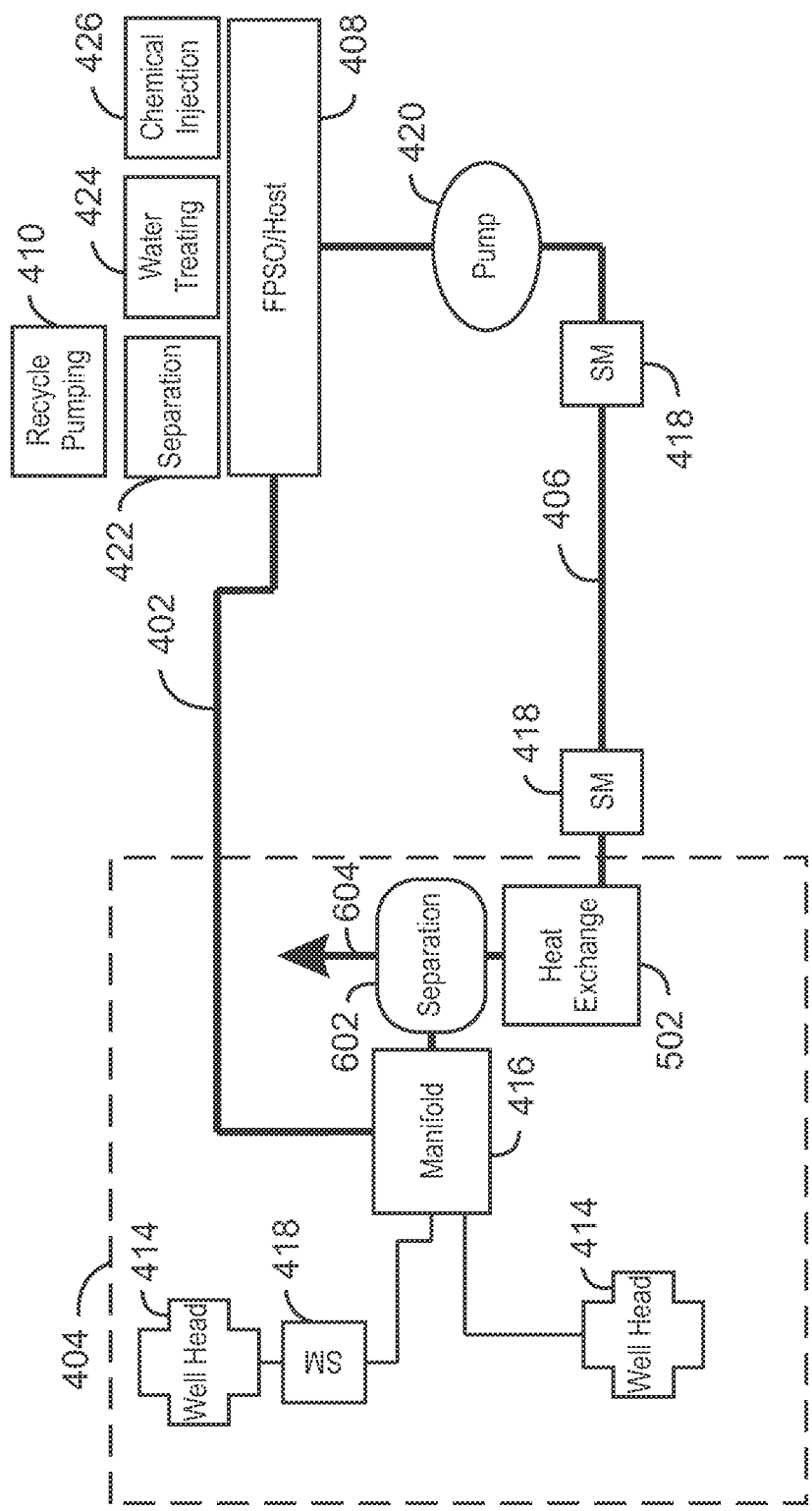
FIG. 7 is a drawing of an injection loop configuration that combines a separator and a heat exchanger.

FIG. 7 is a drawing of an injection loop configuration that combines a separator 602 and a heat exchanger 502. Like numbers are as described with respect to FIG. 4. As described with respect to FIG. 6, a separator 602 can be used to separate liquid from gases. The gas flow stream 604 may be produced separately or injected into a reservoir. The resulting transportation stream may be sent through a heat exchanger 502, as described with respect to FIG. 5, for faster cooling and more efficient formation of the hydrate slurry. The cooled transportation stream may be sent through the transportation line 406 to the surface facility 408 for further processing, as described with respect to FIG. 4.

The aqueous stream does not have to be sent to the injection manifold 416 through a dedicated line 402, but may be sourced from other locations. In current operations, water is often injected into a reservoir to produce more hydrocarbons, as discussed with respect to FIG. 8. A portion of this water may be borrowed for use in the transportation.

Figure 8:
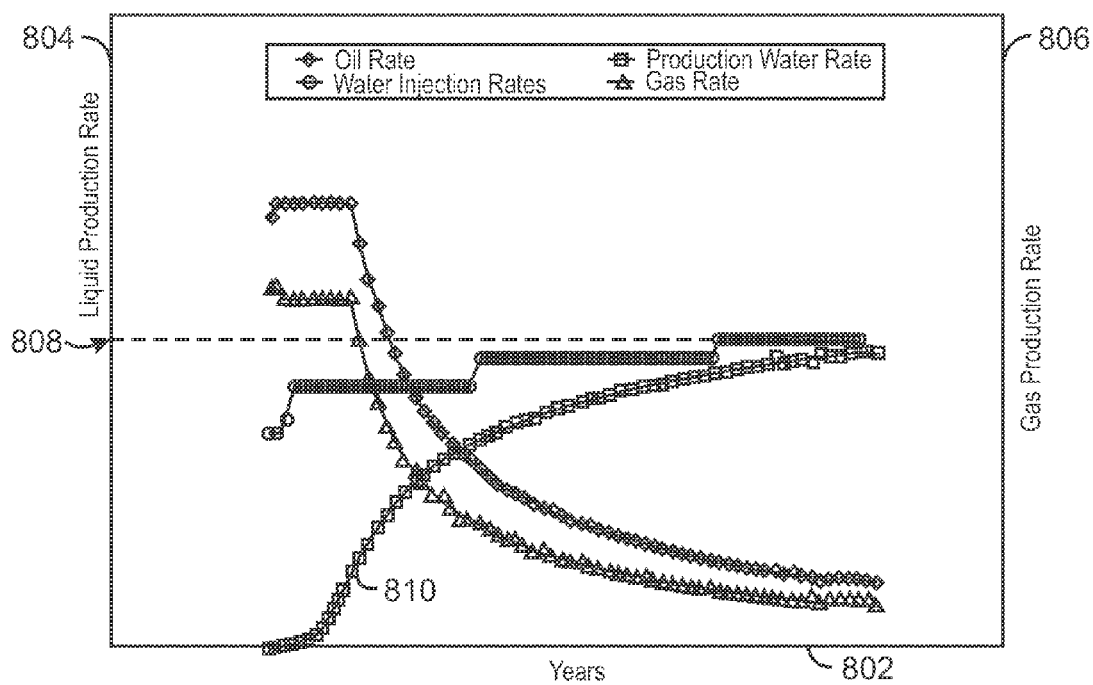
FIG. 8 is a plot of production trends for a field and an associated water injection trend respectively.

FIG. 8 is a plot 800 of production trends for a field and an associated water injection trend respectively. The x-axis 802 represents the time since production started in a field, the left side y-axis 804 represents the relative amounts of various liquids produced, and the right side y-axis 806 represents the gas production rate. The lines for a water injection may be sized for maximum water injection rates for later field life. Depending on the inversion point 112 (FIG. 1), the water injection may be started out at the maximum water injection rate 808. In an embodiment, instead of injecting all of the water to a reservoir, a bypass stream may be sent to the injection manifold 416 in the production center 404 to be mixed with the hydrocarbons fluids as discussed with respect to FIGS. 9-12.

Initially, as the water production rate 810 is low, a large amount of the injected water would be taken through a bypass and injected to form the transportation stream. However, as the water production rate 810 increases in the production fluids, less water can be bypassed into the production fluids and more injected for reservoir maintenance. This may coincide with the conventional water injection profile shown in the plot 800. In some embodiments, if the inversion point is high, the water injection line may be oversized to compensate for the additional water. In this mode of operation, a dual line may not be necessary and may be eliminated if alternative methods of pigging were available.

Figure 9:
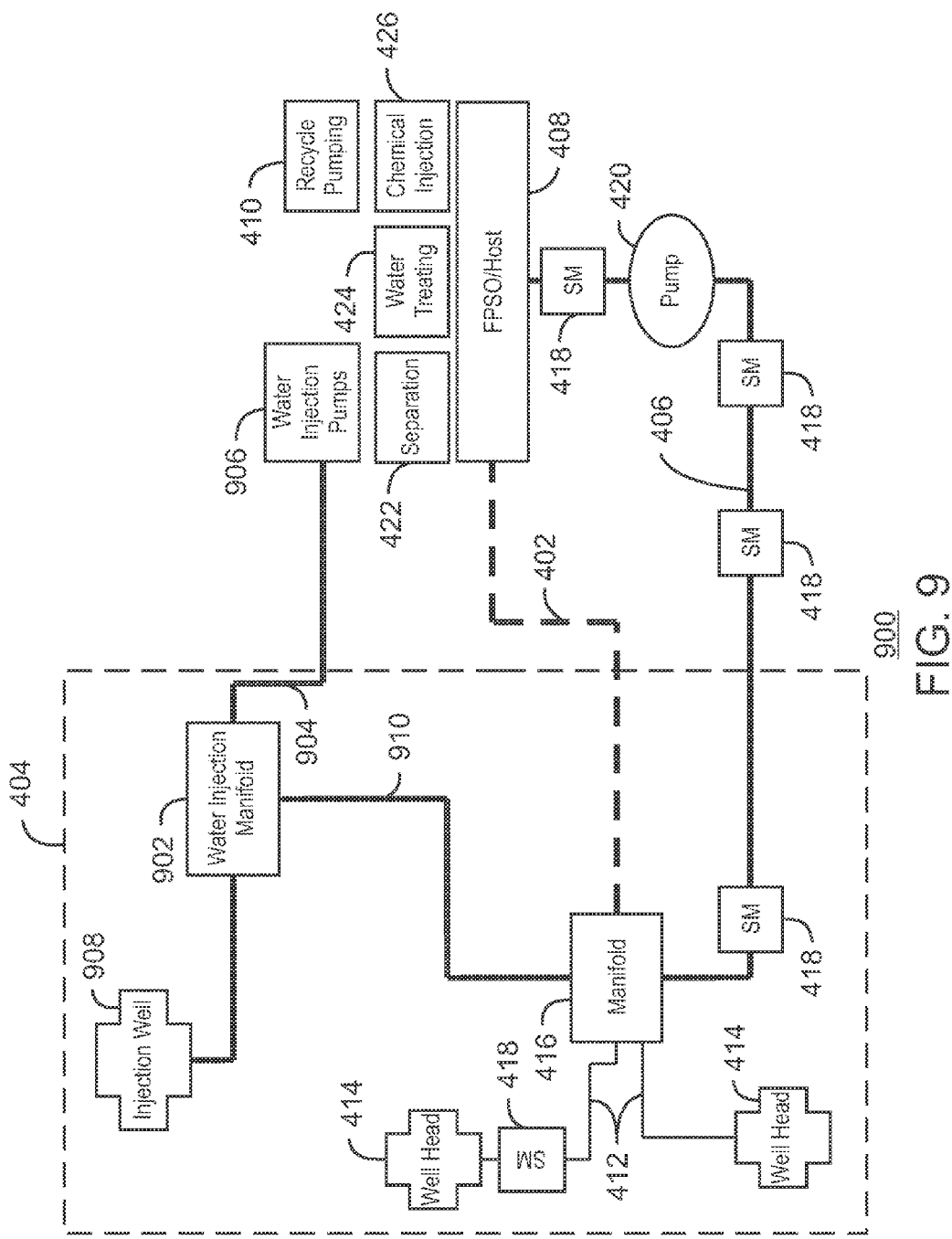
FIG. 9 is a diagram of a water injection system that can utilize a portion of water diverted from a water injection manifold for blending with a production stream to form the transportation stream.

FIG. 9 is a diagram of a water injection system 900 that can utilize a portion of water diverted from a water injection manifold 902 for blending with a production stream 412 to form the transportation stream. Like numbers are as described with respect to FIG. 4. As shown, water would be sent through a water injection line 904 by means of water injection pumps 906. The water can be divided at the water injection manifold 902, and a portion of the water can be sent to a water injection well 908. Another portion can be sent through a separate line 910 to the injection manifold 416 to be mixed with the production streams 412 from the wells 414. Enough water can be sent to the injection manifold 416 to invert the emulsion to a water continuous phase. After forming, the water continuous transportation stream can travel through the transportation line 406 to the surface facility 408.

In the transportation line 406, the transportation stream may cool below a wax appearance temperature or a hydrate formation temperature. Accordingly, static mixers 418 may be placed at intervals throughout the transportation line 406 to create the mixing conditions to prevent wax deposition and to create the transportable hydrate slurry as described with respect to FIG. 2. As discussed with respect to FIG. 4, if a long riser connects the field to the surface facility 408, a pump 420 may be used to transport the fluids to the surface facility 408. At the surface facility 408, the fluids will enter a separator 422 where the oil and gas will be separated from the water. After treatment and any chemical injections, as discussed with respect to FIG. 4, the water may be returned to the water injection manifold 902. In an embodiment, a recycle line 402 may be used in addition to the water injection line 904, to provide additional water to the manifold 416. In embodiments, various combinations of the units discussed herein may be included, as discussed with respect to FIGS. 10-12.

Figure 10:
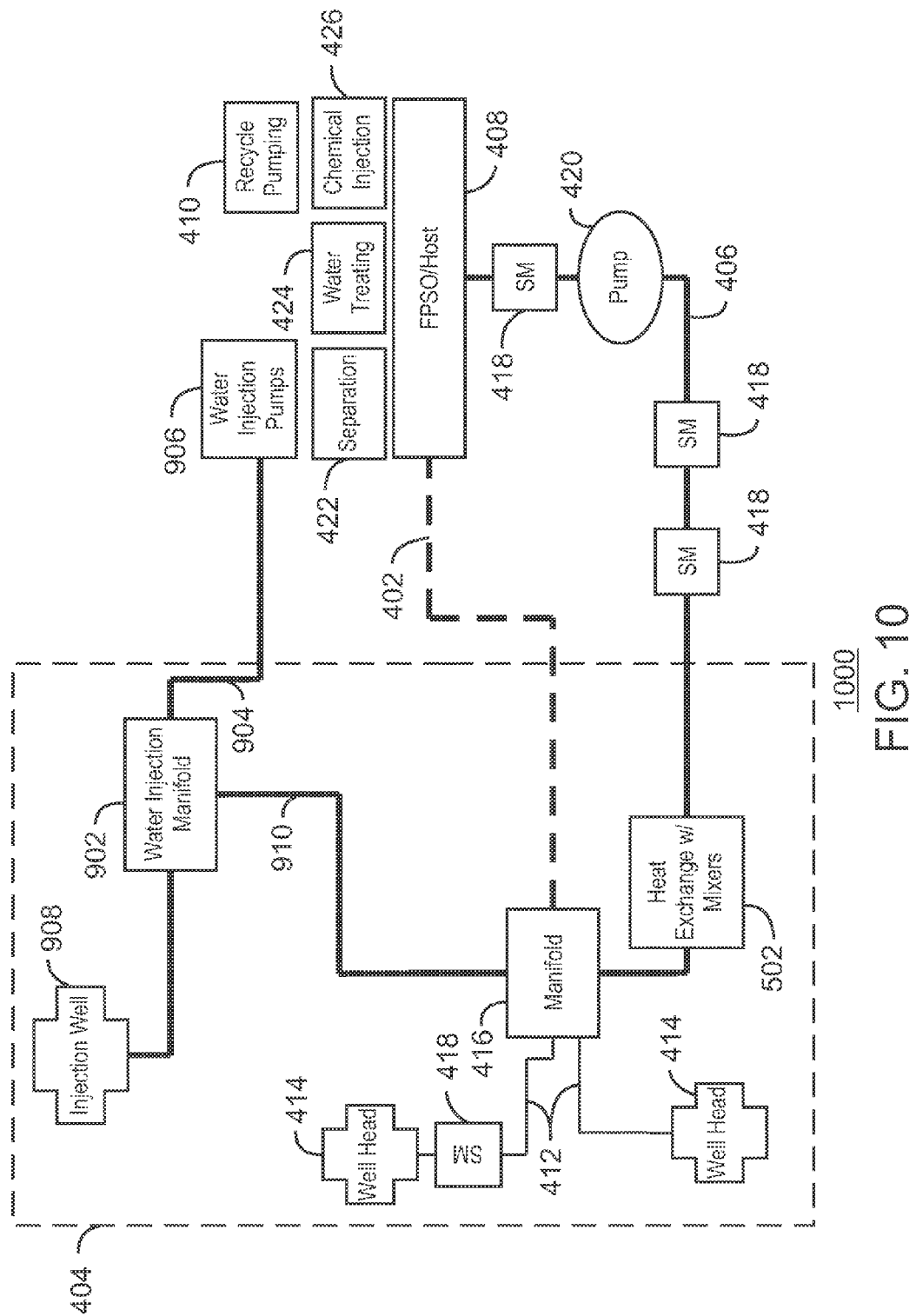
FIG. 10 is a diagram of a water injection loop that adds a heat exchanger to the system discussed in FIG. 9.

FIG. 10 is a diagram of a water injection loop 1000 that adds a heat exchanger 502 to the system discussed in FIG. 9. Like numbers are as discussed with respect to FIGS. 4, 5, and 9. The heat exchanger 502 cools the transportation stream, enhancing the formation of hydrates, which may reduce the number of static mixers 418 used in the transportation line 406.

Figure 11:
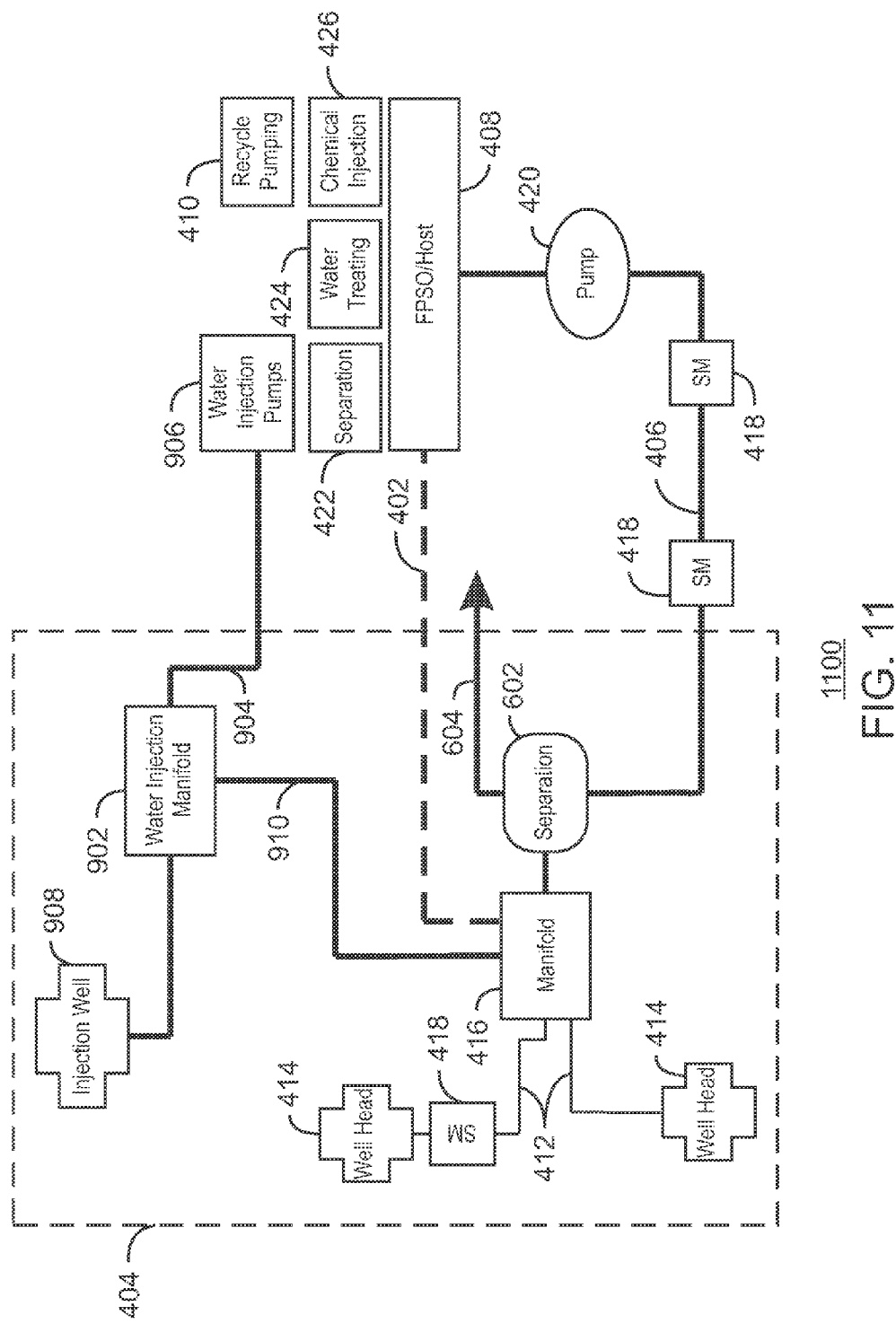
FIG. 11 is a diagram of an injection system that is similar to that shown in FIG. 9, with the addition of a gas separator in the production center, downstream of the injection manifold.

FIG. 11 is a diagram of an injection system 1100 that is similar to that shown in FIG. 9, with the addition of a gas separator 602 in the production center 404, downstream of the injection manifold 416. As discussed with respect to FIG. 6, the gas separator 602 removes gases from the transportation stream that may form larger amounts of hydrates. The resulting gas stream 604 may be produced in another line or may be injected into the reservoir for pressure maintenance. The use of a gas separator 602 to remove the gas may decrease the number of static mixers 418 used in the transportation line 406.

Figure 12:
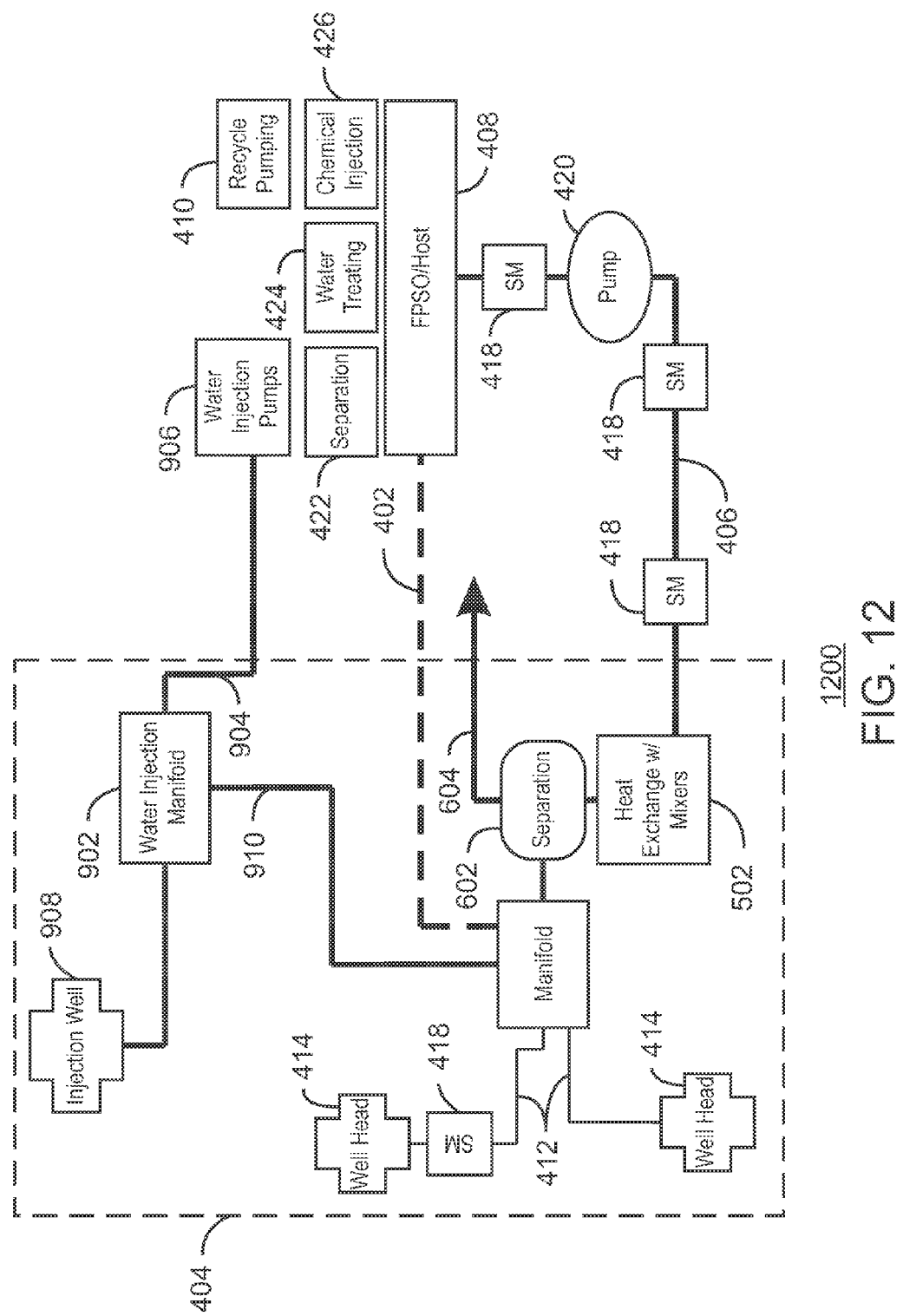
FIG. 12 is similar to the system shown in FIG. 11 with the addition of a heat exchanger on the transportation line, downstream of the gas separator.

FIG. 12 is similar to the system 1100 shown in FIG. 11 with the addition of a heat exchanger 502 on the transportation line 406, downstream of the gas separator 602. Like numbered items are as discussed with respect to FIGS. 4, 5, 6, and 9. As discussed with respect to FIG. 5, the heat exchanger 502 may quickly cool the transportation stream, enhancing the formation of hydrates. This may decrease the number of static mixers 418 used in the transportation line 406.

Figure 13:
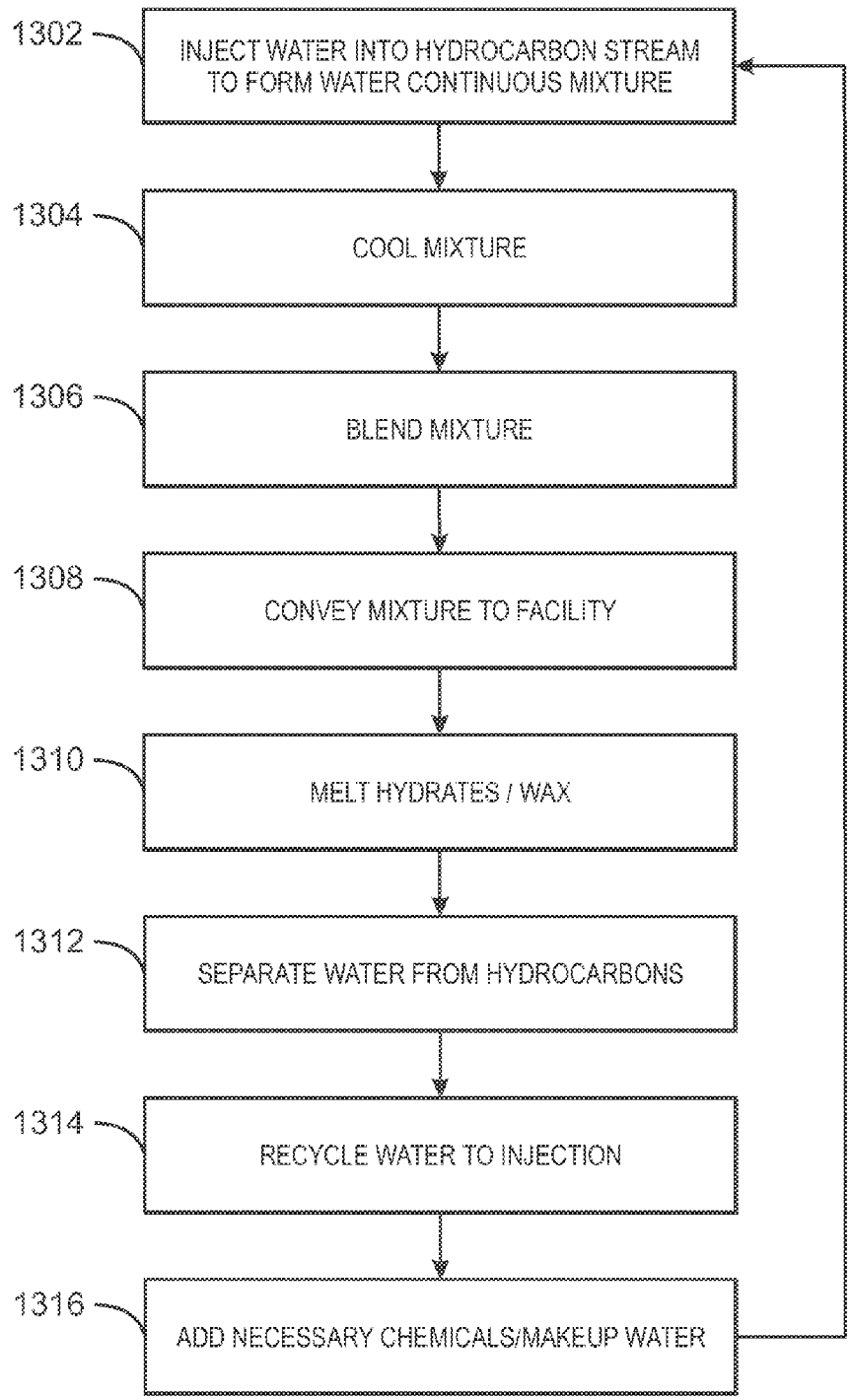
FIG. 13 is a method that may be used for conveying hydrocarbons with the systems described herein.

FIG. 13 is a method 1300 that may be used for conveying hydrocarbons with the systems described herein. The method 1300 begins at block 1302 with the injection of water into a hydrocarbon stream to form a water continuous mixture or transportation stream. The injection may be performed, for example, at an injection manifold in a production center, such as on the ocean floor. The water may be provided from a surface facility through a recycle line or from a bypass on a water injection line, or both. Gases may be separated from the transportation stream before or after the water injection, and may be sent to a facility in a separate line or may be injected into a reservoir for pressure maintenance. At block 1304, the transportation stream may be coded, by flowing the transportation stream through a dedicated heat exchanger, by flowing the transportation stream through an un-insulated transportation line, or both. Cooling may enhance the formation of a hydrate slurry. At block 1306, the transportation stream may be blended, for example, by flowing through a static mixer within a heat exchanger, by flowing through a static mixer, or both. At block 1308, the transportation stream is conveyed to a facility in the transportation line. In various embodiments, the transportation line will include a number of static mixers spaced at intervals along the line. These static mixers are used to continue to blend the transportation stream as cods, which may prevent the formation of wax or hydrate deposits.

Once the transportation stream reaches the facility, at block 1310, the hydrate slurry formed in the transportation stream may be melted. This may be performed as a separate heat addition to a separation unit. At block 1312, the hydrocarbons and water are separated and the hydrocarbons are sent on for further processing. The water may be treated, for example, to remove residual hydrocarbons or solids. Chemicals may be added to facilitate the transportation of the hydrocarbons, such as surfactants, kinetic hydrate inhibitors, thermodynamic hydrate inhibitors, and the like. Other chemicals may be added to facilitate other production operations, including, for example, corrosion inhibitors, scale inhibitors, waterflood chemicals, and the like, depending on the other uses of the water sent to the production center. At block 1314, the treated water is recycled to the production center for injection into the production stream to form a transportation stream, for injection into a reservoir, or both. At block 1316, any chemicals used may be added, in addition to extra makeup water.

Also provided are the following Embodiments A-T:

Embodiment A

A method for transporting a hydrocarbon through a pipeline, comprising:
injecting water into a production stream at a production center, wherein the production stream comprises a hydrocarbon, and wherein the water injection forms a transportation stream comprising a water external phase; and
flowing the transportation stream through a transportation line to a surface facility, wherein the transportation line comprises a plurality of static mixers spaced at intervals along the transportation line.

Embodiment B

The method of Embodiment A, comprising separating the water from the production stream at the surface facility and returning the water to the production center.

Embodiment C

The method of Embodiment B, comprising treating the water at the surface facility after separation.

Embodiment D

The method of Embodiments B or C, comprising adding a chemical to the water at the surface facility prior to transporting the water back to the production center.

Embodiment E

The method of Embodiment D, wherein the chemical comprises a corrosion prevention chemical, a scale inhibition chemical, a thermodynamic hydrate inhibitor, a kinetic hydrate inhibitor, or any combinations thereof.

Embodiment F

The method of any of Embodiments A-E, comprising flowing the transportation stream through a heat exchanger with integral static mixers configured to cool the transportation stream prior to flowing the transportation stream through the plurality of static mixers.

Embodiment G

The method of any of Embodiments A-F, comprising flowing the transportation stream through a separation system at the production center, wherein the separation system is configured to separate gases from the transportation stream.

Embodiment H

The method of Embodiment G, comprising flowing the gases to a surface facility through a gas transportation line.

Embodiment I

The method of Embodiment G, comprising injecting the separated gases into a reservoir.

Embodiment J

The method of any of Embodiments A-I, comprising injecting water into the production stream from a bypass line configured to take a portion of water from an injection stream.

Embodiment K

The method of any of Embodiments A-J, comprising pumping the transportation stream from the production center to the surface facility.

Embodiment L

A system for transporting a hydrocarbon from a production center, comprising:
a water line to a production center;
an injection manifold at the production center configured to inject an aqueous stream from the water line into a production stream, wherein the production stream comprises a hydrocarbon, and wherein the injection of the aqueous stream forms a transportation stream having a water external phase;
a transportation line from the production center, wherein the transportation line comprises a plurality of static mixers, and wherein the transportation line is configured to carry the transportation stream to a surface facility; and
the surface facility, wherein the surface facility comprises:
a separation system configured to separate the hydrocarbon from an aqueous phase;
a treatment system configured to form the aqueous stream from the aqueous phase; and
a pump system configured to return the aqueous stream to the production center through the water line.

Embodiment M

The system of Embodiment L, comprising a pump at the production center configured to pump the transportation stream to the surface facility.

Embodiment N

The system of Embodiment L or M, comprising a heat exchanger with integral static mixers at the production center, wherein the heat exchanger is configured to cool the transportation stream.

Embodiment O

The system of any of Embodiments L-N, wherein the surface facility comprises a chemical injection system configured to inject a chemical into the aqueous stream.

Embodiment P

The system of Embodiment O, wherein the chemical comprises a surfactant.

Embodiment Q

The system of Embodiment O, wherein the chemical comprises a corrosion prevention chemical, a scale inhibition chemical, a thermodynamic hydrate inhibitor, a kinetic hydrate inhibitor, or any combinations thereof.

Embodiment R

The system of any of Embodiments L-Q, comprising a separation unit at the production center, wherein the separation unit is configured to separate a gas stream from the transportation stream.

Embodiment S

The system of Embodiment R, comprising a line configured to carry the gas to a processing surface facility.

Embodiment T

A system for producing a hydrocarbon from a subsea production center, comprising:
   a floating production, storage, and offloading vessel (FSO), comprising:
      a separation system configured to separate a transportation stream comprising a water external phase into a hydrocarbon phase and an aqueous phase;
      a treatment system configured to treat the aqueous phase to form an aqueous stream; and
      a chemical injection system configured to inject chemicals into the aqueous stream;
   an injection line configured to convey the aqueous stream to an injection manifold;
   the injection manifold configured to blend the aqueous stream with a production stream to form the transportation stream; and
   a transportation line configured to carry the transportation stream from the production center to the surface facility, wherein the transportation line comprises a plurality of static mixers placed at intervals along the transportation line.

While the present techniques may be susceptible to various modifications and alternative forms, the exemplary embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for transporting a hydrocarbon through a pipeline, comprising:
   injecting water into a production stream at a production center, wherein the production stream comprises a hydrocarbon, and wherein the water injection forms a transportation stream comprising a water external phase;
   promoting the formation of hydrates around oil droplets and hydrates around gas bubbles, wherein the gas bubbles comprise light hydrocarbons, wherein the hydrates, oil droplets, gas bubbles, and water form a transportable hydrate slurry, and wherein promoting comprises:
      creating the transportable hydrate slurry, wherein creating comprises flowing the transportation stream through a static mixer;
      isolating wax in the oil droplets by cooling the transportable hydrate slurry below a wax appearance temperature or a hydrate formation temperature, wherein cooling comprises contacting the transportable hydrate slurry with the pipeline, flowing the transportable hydrate slurry through a heat exchanger, or both; and
      maintaining the transportable hydrate slurry, wherein maintaining comprises:
         flowing the transportation stream through a plurality of static mixers;
         monitoring a phase behavior of the transportation stream, the size of the hydrate particles, or both; and
         controlling the phase behavior in the transportation stream by adding a thermodynamic hydrate inhibitor to keep the water external phase, and wherein the thermodynamic hydrate inhibitor suppresses capillary attractive forces between hydrate particles; and
   flowing the transportation stream through a transportation line to a surface facility.

2. The method of claim 1, comprising separating the water from the production stream at the surface facility and returning the water to the production center.

3. The method of claim 2, comprising treating the water at the surface facility after separation.

4. The method of claim 2, comprising adding a chemical to the water at the surface facility prior to transporting the water back to the production center.

5. The method of claim 4, wherein the chemical comprises a corrosion prevention chemical, a scale inhibition chemical, a thermodynamic hydrate inhibitor, a kinetic hydrate inhibitor, or any combinations thereof.

6. The method of claim 1, wherein creating the transportable hydrate slurry comprises flowing the transportation stream through a heat exchanger with integral static mixers configured to cool the transportation stream, and wherein the integral static mixers comprise the static mixer used to create the transportable hydrate slurry.

7. The method of claim 1, comprising flowing the transportation stream through a separation system at the production center, wherein the separation system is configured to separate gases from the transportation stream.

8. The method of claim 7, comprising flowing the gases to a surface facility through a gas transportation line.

9. The method of claim 7, comprising injecting the separated gases into a reservoir.

10. The method of claim 1, comprising injecting water into the production stream from a bypass line configured to take a portion of water from an injection stream.

11. The method of claim 1, comprising pumping the transportation stream from the production center to the surface facility.

12. The method of claim 1, further comprising:
   pigging the production stream, and
   wherein the plurality of static mixers are piggable static mixers.

13. The method of claim 1, further comprising:
adding an anti-agglomerate to the production stream, and
flowing the production stream through the transportation line at a temperature below the hydrate formation temperature of the production stream, the hydrate formation temperature determined with the addition of anti-agglomerate.

* * * * *